United States Patent [19]
Cohen

[11] Patent Number: 5,636,797
[45] Date of Patent: Jun. 10, 1997

[54] DRIP IRRIGATION EMITTER AND FLOW CONTROL UNIT INCLUDED THEREIN

[76] Inventor: Amir Cohen, Yuvalim, 20 142 Doar Na Gush Segev, Israel

[21] Appl. No.: 389,479

[22] Filed: Feb. 16, 1995

Related U.S. Application Data

[63] Continuation-in-part of Ser. No. 348,852, Nov. 28, 1994, which is a continuation-in-part of Ser. No. 99,509, Jul. 30, 1993, Pat. No. 5,400,973.

[30] Foreign Application Priority Data

| Jun. 20, 1994 | [IL] | Israel | 110062 |
| Jul. 15, 1994 | [IL] | Israel | 110337 |
| Jan. 11, 1995 | [IL] | Israel | 112311 |

[51] Int. Cl.$^6$ .................................................. B05B 15/00
[52] U.S. Cl. ........................................ 239/542; 239/547
[58] Field of Search ............................... 239/542, 547, 239/562, 463, 464, 533.1, 533.13, 553.3; 138/42, 44, 45

[56] References Cited

U.S. PATENT DOCUMENTS

| 4,210,287 | 7/1980 | Menoudar | 239/547 |
| 4,369,923 | 1/1983 | Bron | 239/542 |
| 4,413,786 | 11/1983 | Mehoudar | 239/542 |
| 4,428,397 | 1/1984 | Bron | 239/542 |
| 5,052,625 | 10/1991 | Ruskin | 239/542 |
| 5,279,462 | 1/1994 | Mehoudar | 239/542 |

*Primary Examiner*—Kevin P. Shaver
*Assistant Examiner*—Lisa Douglas
*Attorney, Agent, or Firm*—Benjamin J. Barish

[57] ABSTRACT

A drip irrigation emitter includes a tube having a plurality of flow control units bonded to its inner face providing a flow control passageway between the interior of the tube and each of a plurality of discharge openings formed through the wall of the tube. Each flow control unit includes a body member bonded to the inner face of the tube, a cover also bonded to the inner face of the tube, and a deformable elastomeric membrane between the body member and cover and defining a pressure-compensated flow control passageway through the flow control unit.

20 Claims, 2 Drawing Sheets

DRIP IRRIGATION EMITTER AND FLOW CONTROL UNIT INCLUDED THEREIN

RELATED APPLICATIONS

The present application is a continuation-in-part of my application Ser. No. 08/348,852 filed Nov. 28, 1994, which in turn is a continuation-in-part of my application Ser. No. 08/099,509, filed Jul. 30, 1993, now U.S. Pat. No. 5,400,973.

FIELD AND BACKGROUND OF THE INVENTION

The present invention relates to a drip irrigation emitter, and also to a flow control unit included in such an emitter.

The invention is particularly applicable to the tube-type drip irrigation emitter, including a tube for conducting water therethrough and formed with a plurality of discharge openings spaced along the length of the tube, and a plurality of flow control units bonded to the inner face of the tube at spaced intervals along the length of the tube. Such flow control units are applied to the tube at the time the tube is extruded and while the tube is still soft, so that the flow control unit is firmly bonded to the inner face of the tube.

OBJECTS AND BRIEF SUMMARY OF THE INVENTION

An object of the present invention is to provide a drip irrigation emitter of the foregoing type having advantages over the known emitters, as will be described more particularly below. Another object of the present invention is to provide a flow control unit for use in making such tube-type drip irrigation emitters.

According to one aspect of the present invention, there is provided a drip irrigation emitter, comprising a tube for conducting pressurized water therethrough and formed with a plurality of discharge openings spaced along the length thereof; and a plurality of flow control units bonded to the inner face of the tube at spaced intervals along the length thereof, each flow control unit including an inlet communicating with the interior of the tube, an outlet communicating with one of the discharge openings, and a flow control passageway connecting the inlet to the outlet. Each of the flow control units comprises: a body member having an outer face bonded to the inner face of the tube, and an inner face facing the interior of the tube; a deformable elastomeric membrane having an outer face defining the flow control passageway with the inner face of the body member, and an inner face facing the interior of the tube; and a cover covering the inner face of the membrane and also bonded to the inner face of the tube.

According to further features in the described preferred embodiment, the cover is bonded to the inner face of the tube by longitudinally-extending edges on opposite sides of the cover conforming to the curvature of the inner face of the tube.

Such a construction firmly bonds the cover as well as the body member to the inner face of the tube, preferably by heat-welding the units to the inner face of the tube at the time of extrusion of the tube.

According to still further features in the described preferred embodiment, the cover is formed with a plurality of slits therethrough defining filtering passageways exposing the inner face of the membrane to the pressurized water within the tube.

In addition, the cover includes a section extending past the membrane and formed with further slits definining the inlet to the flow control passageway. Such a construction provides a large number of filtering passageways not only for exposing the inner face of the membrane to the pressure of the water within the tube, but also for feeding the water into the inlet of the flow control passageway.

An important advantage of such a construction is that the slits can be made to occupy substantially the complete surface of the cover, thereby providing a very large surface area for inletting the water into the flow control unit while at the same time blocking out dirt particles. In addition, in such a construction the inlet passages defined by the slits are in the center region of the tube, rather than near the inner surface of the tube (where dirt particles tend to settle or accumulate), thereby better assuring that the water inletted into the flow control unit will be relatively clean.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
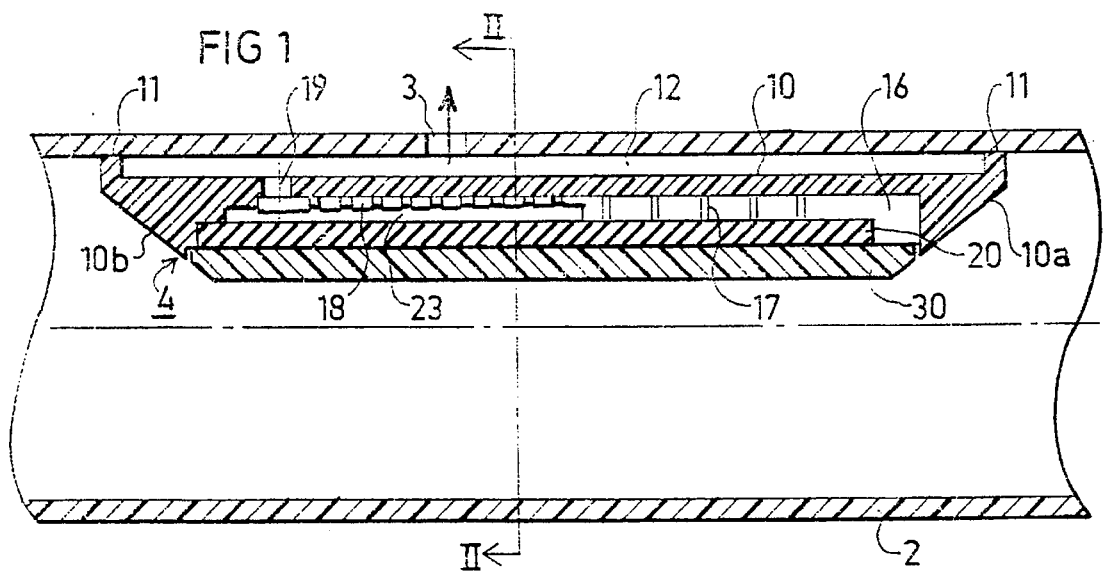
FIG. 1 is a longitudinal sectional view illustrating a portion of a drip irrigation emitter constructed in accordance with the present invention.

The drip irrigation emitter illustrated in FIG. 1 comprises a tube 2 for conducting water therethrough and formed with a plurality of discharge openings 3 spaced along the length of the tube. Such an irrigation tube also includes a plurality of flow control units, generally designated 4, bonded to the inner face of the tube at spaced intervals along its length. Each flow control unit extends for substantially less than one-half the circumference of tube 2, and includes an inlet communicating with the interior of the tube, an outlet communicating with one of the discharge openings 3, and a flow control passageway connecting the inlet to the outlet. For simplification purposes, FIG. 1 illustrates only a portion of the tube having a single discharge outlet 3, and a single flow control unit 4 for the respective discharge outlet.

Each flow control unit 4 includes three members: a body, generally designated 10; a deformable elastomeric membrane, generally designated 20; and a cover, generally designated 30, fixed to the body member and covering the inner face of the membrane.

Body member 10 is formed with an outer face 11 conforming to the curvature of, and bonded by heat welding to, the inner face of the tube 2. The outer face 11 of body member 10 is also formed with a cavity 12 defining, with the inner face of the tube 2, an outlet chamber communicating with the respective discharge opening 3 in the tube 2.

Figure 5:
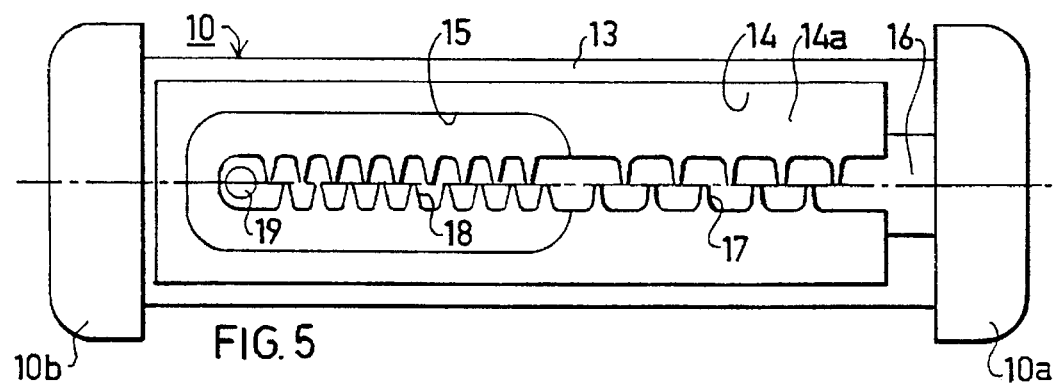
FIG. 5 is a view of the flow control unit of FIG. 1 as viewed from the interior of the tube but with the cover and membrane/removed.

The inner face of body member 10 (i.e., the face exposed to the interior of tube 2) is formed with a flat outer rim 13 (FIG. 5) of generally rectangular configuration for seating the cover 30. A large rectangular cavity 14 is thus defined by rim 13. Cavity 14 includes a flat bottom surface 14a which serves as a seat for the membrane 20. A second cavity 15 is formed within and at one end of cavity 14.

The inner face of body member 10 is further formed with a recess 16 in one end of the rectangular rim 13, a first plurality of baffles 17 within cavity 14, a second plurality of baffles 18 within cavity 15, and an outlet opening 19 through the body member.

Figure 6:
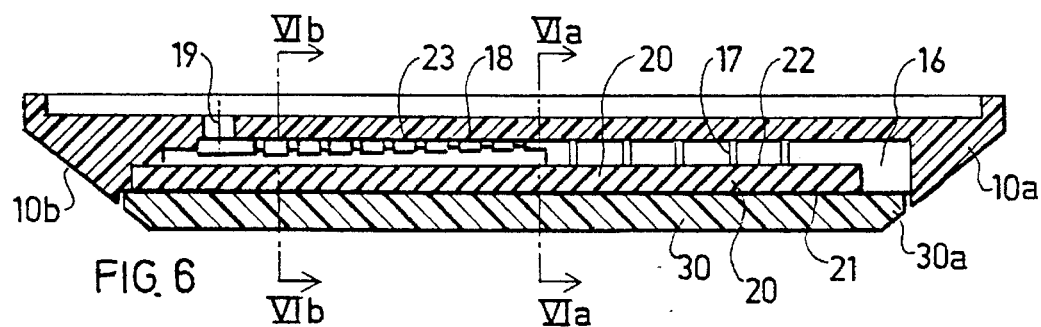
FIG. 6 is a longitudinal sectional view along line VI—VI of FIG. 4.

Membrane 20 is seated on the flat surface 14a of cavity 14 to overlie baffles 17, baffles 18, and the outlet opening 19, but not the recess 16 in the rim, as shown in FIGS. 1 and 6. Cover 30 engages the inner surface 21 of membrane 20 and presses its outer surface 22 against the flat surface 14a of the body member.

Baffles 17 formed in cavity 14 are all of the same height, and their edges are engaged by the outer surface 22 of membrane 20 when assembled into the flow control unit. Therefore, the labyrinth defined by baffles 17 and the outer surface 22 of membrane 20 is of fixed dimensions.

However, baffles 18 formed in cavity 15 are of decreasing height from the outlet opening 19 towards the fixed-height baffles 17 and define a pressure-compensated flow control passageway. That is, in the absence of pressure applied to membrane 20 by the water within the tube, the membrane is spaced from the edges of baffles 18 such that the outer face of the membrane defines with the baffles a plurality of clearances 23 of increasing height from the outlet opening 19 towards the fixed-height baffles 17, which clearances successively close with an increase in pressure applied to the inner face of the membrane.

Figure 4:
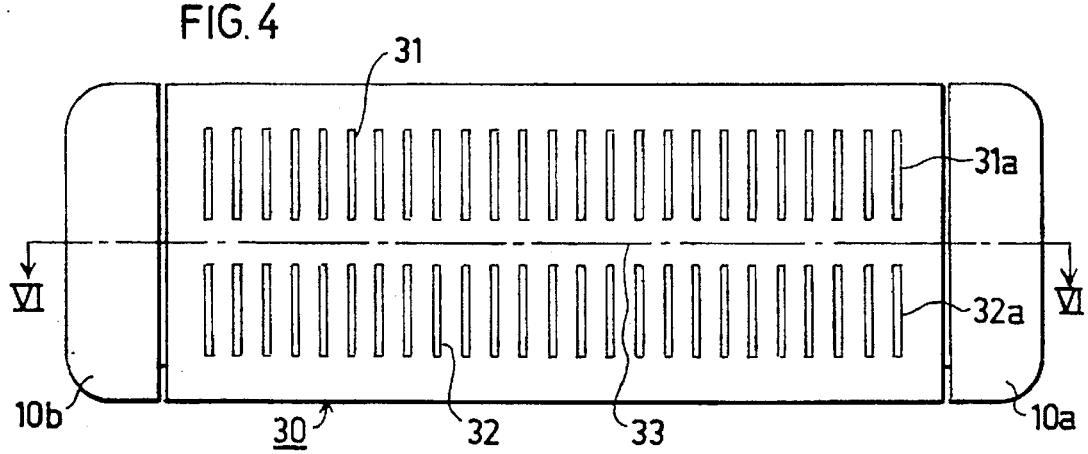
FIG. 4 is a plan view of the flow control unit viewed from the interior of the tube.
Figure 6A:
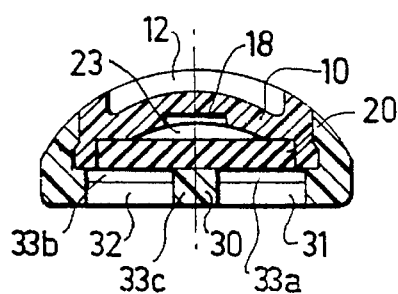
FIGS. 6a and 6b are transverse sectional views along lines VIa—VIa and VIb—VIb of FIG. 6, respectively.
Figure 6B:
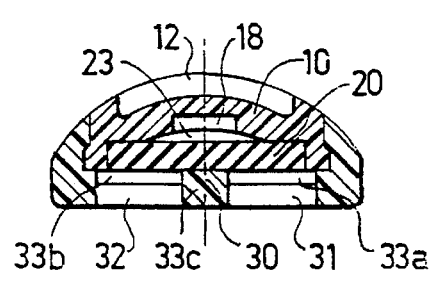

As shown particularly in FIG. 4, cover 30 is formed with two rows of transversely-extending slits 31, 32 on opposite sides of the center line 33 of the cover. The outer face of cover 30 (i.e., the one facing membrane 20) is formed with two recesses 33a, 33b (FIGS. 6a, 6b) extending for the length of the cover and communicating with slits 31 and 32, respectively. The center portion 33c of the cover extending along the center line is unrecessed.

Membrane 20 is of rectangular configuration, corresponding to the outer dimensions of the flat surface 14a circumscribed by rim 13 in body member 10, except that the membrane, as noted earlier, is slightly shorter than the rim 13 so that it does not overlie the recess 16 formed in one end (the right end) of the rim. Cover 30, however, includes a section 30a (FIG. 6) which extends past the respective end of membrane 20, and overlies recess 16 in rim 13 of the body member 10.

Thus, when the cover 30 is assembled to the body member 10, with the membrane 20 in between, slits 31, 32 through the cover, and their respective recesses 33a, 33b in the outer face of the cover facing the membrane, expose the inner surface 21 of membrane 20 to the inlet pressure, whereas the slits 31a, 32a (FIG. 4) through the end section 30a of the cover serve as inlets via recess 16 to the labyrinth defined by baffles 17. Membrane 20 is firmly clamped by cover 30 between flat surface 14a of the body member and the central unrecessed surface 33c of the cover.

Figure 2:
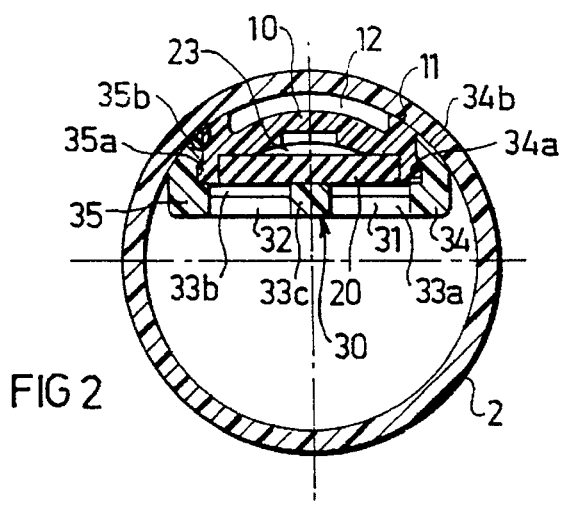
FIG. 2 is a transverse sectional view along line II—II of FIG. 1.
Figure 3:
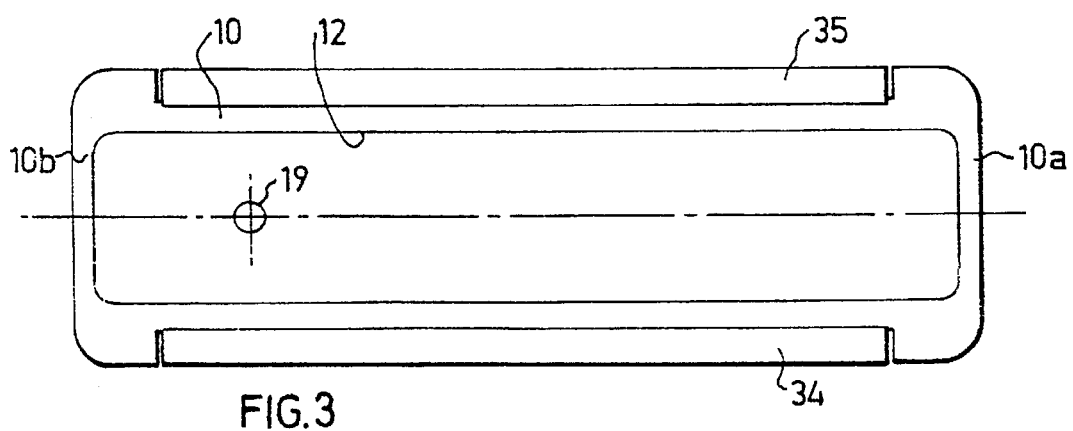
FIG. 3 is a plan view of the flow control unit as viewed from the face thereof facing the inner surface of the tube.

As seen particularly in FIG. 2, the two longitudinal side sections 34, 35 of cover 30 are formed on their inner surfaces with longitudinally-extending grooves 34a, 35a, adapted to receive longitudinally-extending ribs formed in the longitudinal sides of the body member 10 for temporarily retaining the body member assembled to the cover, with the membrane 20 between the two, until the assembly is bonded to the inner face of the tube 2. The longitudinal side sections 34, 35 of cover 30 are further formed with curved surfaces 34b, 35b, conforming to the curvature of tube 2, to engage the tube during the extrusion process and to become welded to the tube, together with the curved surfaces 11 of body member 10, during the extrusion of the tube.

The outer surfaces of the two transverse end sections 10a, 10b at the opposite ends of body member 10 are slanted so as to be substantially flush with the respective edges of cover 30 (e.g., see FIG. 6), thereby minimizing the interference of these surfaces with the flow of the water through the tube.

The foregoing arrangement temporarily holds the three members 10, 20, 30 in assembled condition and thereby facilitates the application of these three members, in assembled condition, to the tube during the time of extrusion of the tube. In addition, since the longitudinal edges 34b, 35b, of the cover 30, as well as the longitudinal edges of the body member, are bonded to the inner face of the tube 2 during the time of extrusion of the tube, a very secure bond is produced between both the body member 10 and the cover 30 of the flow control unit 4, and the inner surface of the tube 2.

Further, providing substantially the complete surface of the cover 30 with the slits 31, 32, produces many filtering passages from the interior of the tube 2 into the interior of the flow control unit 4. Moreover, since these slits are located in the central area of the tube, there is better assurance that the water fed into the flow control unit will be relatively clean of solid particles as solid particles in the water would tend to move or settle along the inner surface of the tube 2 rather than in the central area of the tube where the slits 31, 32 are located.

While the invention has been described with respect to one preferred embodiment, it will be appreciated that this is set forth merely for purposes of example, and that many other variations, modifications and applications of the invention may be made.

I claim:

1. A drip irrigation emitter, comprising:
   a tube for conducting pressurized water therethrough and formed with a plurality of discharge openings spaced along the length thereof;
   and a plurality of flow control units bonded to the inner face of the tube at spaced intervals along the length thereof, each flow control unit including an inlet communicating with the interior of the tube, an outlet communicating with one of said discharge openings, and a flow control passageway connecting said inlet to said outlet;
   characterized in that each of said flow control units comprises:
   a body member having an outer face bonded to the inner face of the tube, and an inner face facing the interior of the tube;
   a deformable elastomeric membrane having an outer face defining said flow control passageway with said inner face of the body member, and an inner face facing the interior of the tube;
   and a cover covering the inner face of said membrane and also bonded to the inner face of the tube.

2. The emitter according to claim 1, wherein said cover is bonded to the inner face of the tube by longitudinally-extending edges on opposite sides of the cover conforming to the curvature of the inner face of the tube.

3. The emitter according to claim 1, wherein the cover is formed with a plurality of slits therethrough defining filtering passageways exposing the inner face of the membrane to the pressurized water within the tube.

4. The emitter according to claim 3, wherein said cover includes a section extending past the membrane and formed with further slits definining the inlet to said flow control passageway.

5. The emitter according to claim 3, wherein said slits are formed in substantially the complete surface of said cover.

6. The emitter according to claim 1, wherein said body member and said cover extend for substantially less than one-half the circumference of said tube.

7. The emitter according to claim 1, wherein said inner face of the body member is formed with a plurality of baffles defining a labyrinth-type flow-control passageway with the outer face of the membrane.

8. The emitter according to claim 7, wherein said baffles define with said membrane a plurality of clearances which are successively closed with an increase in the inlet pressure, to thereby maintain a substantially constant flow through the outlet of the flow control unit despite variations in the water pressure within the tube.

9. The emitter according to claim 1, wherein the longitudinal edges of the cover are formed with longitudinal grooves receiving ribs formed in the longitudinal edges of the body member for retaining the cover assembled to the body member with the membrane clamped between the cover and the body member, until the body member and cover are bonded to the inner face of the tube.

10. A drip irrigation emitter, comprising:

a tube for conducting water therethrough and formed with a plurality of discharge openings spaced along the length thereof;

a plurality of flow control units bonded to the inner face of the tube at spaced intervals along the length thereof, each flow control unit including an inlet communicating with the interior of the tube, an outlet communicating with one of said discharge openings, and a flow control passageway connecting said inlet to said outlet;

characterized in that each of said flow control units comprises:

a body member having an outer face bonded to the inner face of the tube, and an inner face facing the interior of the tube and formed with a plurality of baffles thereon;

a deformable elastomeric membrane having an outer face covering said baffles and defining a labyrinth therewith having an inlet end communicating with the interior of said tube and an outlet end communicating with said outlet of the flow control unit, said membrane having an inner face facing the interior of said tube;

and a cover fixed to said body member and covering the inner face of said membrane;

said cover being formed with a plurality of slits therethrough defining filtering passageways exposing the inner face of the membrane to the pressure of the water within the tube.

11. The emitter according to claim 10, wherein said membrane is seated on a flat surface formed with a recess at one end not covered by the membrane, said cover including a section also covering said recess, such that the slits in said section, and said recess, serve as an inlet to said labyrinth.

12. The emitter according to claim 10, wherein said cover includes longitudinal edges conforming to the curvature of the inner face of said tube, and also to be bonded to the inner face of said tube.

13. A flow control unit for bonding to the inner face of the tube formed with a discharge opening therethrough to produce a drip irrigation emitter, said flow control unit comprising:

a body member having an outer surface conforming to the curvature of the inner face of the tube for bonding to the inner face of the tube, said body member having an inner face to face the interior of the tube;

a deformable elastomeric membrane having an outer face defining a flow control passageway with said inner face of the body member, and an inner face to face the interior of the tube;

and a cover covering the inner face of said membrane, said cover having opposed longitudinally-extending edges conforming to the curvature of the inner face of the tube for also bonding to the inner face of the tube.

14. The flow control unit according to claim 13, wherein the cover is formed with a plurality of slits therethrough defining filtering passageways exposing the inner face of the membrane to the pressure of the water within the tube.

15. The flow control unit according to claim 14, wherein said covering includes a section extending past the membrane and formed with further slits definining the inlet to said flow control passageway.

16. The flow control unit according to claim 14, wherein said slits are formed in substantially the complete surface of said cover.

17. The flow control unit according to claim 13, wherein said body member and said cover extend for substantially less than one-half the circumference of said tube.

18. The flow control unit according to claim 13, wherein said inner face of the body member is formed with a plurality of baffles defining a labyrinth-type flow-control passageway with the outer face of the membrane.

19. The flow control unit according to claim 18, wherein said baffles define with said membrane a plurality of clearances which are successively closed with an increase in the inlet pressure, to thereby maintain a substantially constant flow through the outlet of the flow control unit irrespective of variations in the water pressure within the tube.

20. The flow control unit according to claim 13, wherein the longitudinal edges of the cover are formed with longitudinal grooves receiving ribs formed in the longitudinal edges of the body member for retaining the cover attached to the body member, with the membrane clamped between the cover and the body member, until the body member and cover are bonded to the inner face of the tube.

* * * * *